(12) United States Patent
Wheelington

(10) Patent No.: US 9,027,709 B2
(45) Date of Patent: May 12, 2015

(54) MODULAR TREE STAND

(71) Applicant: Advanced Treestand Investments, LLC, Smackover, AR (US)

(72) Inventor: Ryan S. Wheelington, Louann, AR (US)

(73) Assignee: Advanced Treestand Investments, LLC, Smackover, AR (US)

( * ) Notice: Subject to any disclaimer, the term of this patent is extended or adjusted under 35 U.S.C. 154(b) by 68 days.

(21) Appl. No.: 14/081,299

(22) Filed: Nov. 15, 2013

(65) Prior Publication Data

US 2014/0190767 A1    Jul. 10, 2014

Related U.S. Application Data

(60) Provisional application No. 61/750,507, filed on Jan. 9, 2013.

(51) Int. Cl.
*E04G 1/00* (2006.01)
*E04G 3/00* (2006.01)
*E06C 5/32* (2006.01)
*A01M 31/02* (2006.01)

(52) U.S. Cl.
CPC ..................................... *A01M 31/02* (2013.01)

(58) Field of Classification Search
CPC ...... A01M 31/02; A01M 31/025; A47C 9/10; A45B 5/00; E04G 3/24; A63B 71/023; F16M 13/02; G09F 7/18; E04H 12/24
See application file for complete search history.

(56) References Cited

U.S. PATENT DOCUMENTS

| | | | |
|---|---|---|---|
| 2,855,980 A | 10/1958 | Konieczka | |
| 3,175,806 A * | 3/1965 | Prete, Jr. | 24/68 CD |
| 4,120,379 A * | 10/1978 | Carter | 182/187 |
| 4,236,602 A | 12/1980 | Leggett | |
| 4,722,501 A | 2/1988 | Ruhl | |
| 5,060,756 A * | 10/1991 | D'Acquisto | 182/187 |
| 5,282,520 A | 2/1994 | Walker | |
| 5,443,342 A * | 8/1995 | Huang | 410/151 |
| 5,507,362 A * | 4/1996 | Krueger | 182/3 |
| D373,427 S | 9/1996 | Russom | |
| 5,641,036 A * | 6/1997 | Maxwell | 182/135 |
| 5,848,666 A * | 12/1998 | Woodall et al. | 182/187 |
| RE36,276 E * | 8/1999 | Smith | 182/187 |
| 5,947,666 A * | 9/1999 | Huang | 410/151 |
| 5,988,963 A * | 11/1999 | Shiau | 410/151 |
| 6,003,632 A | 12/1999 | Miller | |
| 6,085,868 A * | 7/2000 | Anthony et al. | 182/187 |
| 6,185,303 B1 | 2/2001 | Losey | |
| D444,573 S | 7/2001 | Owens et al. | |
| D445,201 S | 7/2001 | D'Acquisto | |
| 6,322,279 B1 | 11/2001 | Yamamoto et al. | |
| 6,325,174 B1 | 12/2001 | Lamar | |
| 6,334,508 B1 * | 1/2002 | Shields | 182/116 |
| 6,367,585 B1 * | 4/2002 | Fast | 182/187 |

(Continued)

*Primary Examiner* — Katherine Mitchell
*Assistant Examiner* — Shiref Mekhaeil
(74) *Attorney, Agent, or Firm* — Brown & Michaels, PC

(57) ABSTRACT

A tree stand for removable attachment to a tree comprising: a support bar having an upper end and a lower end with a length therebetween; an upper jaw coupled to the upper end of the support bar and a lower jaw coupled to the lower end of the support bar, and a platform mounted to the outer side of the lower jaw by insertion of a set of protrusions on the platform into the pivoting snap locks of the arms of the lower jaw. A seat may also be attached to the support par through the upper jaw.

7 Claims, 18 Drawing Sheets

(56) References Cited

U.S. PATENT DOCUMENTS

| | | | |
|---|---|---|---|
| 6,386,321 B1 * | 5/2002 | Muhich | 182/187 |
| 6,568,505 B1 * | 5/2003 | D'Acquisto | 182/187 |
| 6,571,916 B1 * | 6/2003 | Swanson | 182/187 |
| 6,702,239 B2 | 3/2004 | Boucher | |
| 6,722,472 B2 | 4/2004 | Berkbuegler | |
| 6,837,642 B1 * | 1/2005 | Lin | 403/109.1 |
| 6,880,810 B1 | 4/2005 | Hu | |
| 7,296,658 B1 * | 11/2007 | Pederson | 182/133 |
| 7,377,361 B1 * | 5/2008 | Tschida | 182/188 |
| 7,845,621 B1 * | 12/2010 | Lu | 254/218 |
| 7,926,775 B1 * | 4/2011 | Milazzo et al. | 248/230.8 |
| 8,177,177 B2 | 5/2012 | Ehrig et al. | |
| 8,434,979 B1 * | 5/2013 | Genge | 410/103 |
| 8,490,930 B2 * | 7/2013 | Huang | 248/125.2 |
| 8,708,592 B1 * | 4/2014 | Gardner | 403/53 |
| 2002/0148685 A1 * | 10/2002 | Shan et al. | 182/187 |
| 2003/0192741 A1 * | 10/2003 | Berkbuegler | 182/187 |
| 2004/0149871 A1 | 8/2004 | Authement | |
| 2006/0054397 A1 * | 3/2006 | Pringnitz | 182/187 |
| 2007/0151803 A1 * | 7/2007 | D'Acquisto | 182/187 |
| 2007/0235261 A1 * | 10/2007 | Forrest | 182/136 |
| 2007/0261919 A1 * | 11/2007 | Roe | 182/187 |
| 2009/0064743 A1 * | 3/2009 | Gee | 70/263 |
| 2009/0095569 A1 * | 4/2009 | Cooper et al. | 182/187 |
| 2009/0321186 A1 * | 12/2009 | Louchart | 182/188 |
| 2010/0176263 A1 * | 7/2010 | Ehrig et al. | 248/304 |
| 2010/0300808 A1 * | 12/2010 | Hale | 182/187 |
| 2011/0041300 A1 * | 2/2011 | Lu | 24/68 CD |
| 2011/0132686 A1 * | 6/2011 | Priest | 182/187 |
| 2011/0308887 A1 * | 12/2011 | Johnson | 182/187 |
| 2012/0119044 A1 * | 5/2012 | Wilson | 248/219.4 |
| 2012/0199418 A1 * | 8/2012 | Priest | 182/129 |
| 2014/0131137 A1 * | 5/2014 | Bassett | 182/116 |
| 2014/0311828 A1 * | 10/2014 | Bassett et al. | 182/124 |

* cited by examiner

MODULAR TREE STAND

REFERENCE TO RELATED APPLICATIONS

This application claims one or more inventions which were disclosed in Provisional Application No. 61/750,507 filed Jan. 9, 2013, entitled "MODULAR TREE STAND". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of tree stands for hunting. More particularly, the invention pertains to portable, tree stands that include modular parts that can be readily transported and then fitted together for rapid installation upon a tree at a desired hunting site.

2. Description of Related Art

Tree stands afford many advantages to hunters. When properly secured in elevated positions, modem tree stands provide an ideal and safe observation point that is ideal for inconspicuously observing and bagging of game animals. An elevated position amplifies the hunter's field of view, enlarging the potential target area.

Numerous diverse tree stands exist in the art. Large, relatively heavy permanent stands are well known. When properly built, the stands can provide a sheltered hunting position well above ground offering superb visibility of about a 360 degree radius. Permanent stands have several advantages, but they are large, heavy and cumbersome. They can be difficult and time consuming to erect, and cannot be moved between hunting locations without significant, time-consuming effort.

Portable tree stands are lightweight, relatively compact, and are easily transported. Lightweight stands can be easily transported through the woods for subsequent erection and deployment. When a different hunting location is preferred, portable stands readily disassemble for transportation and use elsewhere. Portable stands typically comprise a seat supported upon a frame that is adapted to be semi-permanently attached to a tree.

With "climber" tree stands, various hinged frame elements that encircle the tree trunk can be intermittently moved into and out of binding contact with the tree trunk to facilitate upward movement. As one frame element is loosened, it can be lifted vertically, while the other frame element temporarily remains in binding contact with the tree trunk. Climbing stands require substantial physical effort by the hunter for deployment. Moreover, many hunters consider the safety of climbing stands to be suspect, and their relative discomfort is a common complaint.

With portable designs, non-climbing tree stands present a safer, more secure choice. These typically have seats secured to rigid frame elements. Typically, they are supported above ground by one or more vertical ladder elements that elevate the stand. The seat, which may be swiveled for limited rotation so that a large ground radius may be conveniently observed, provides a comfortable and stable rest for the hunter. The frame may be anchored to the tree above ground by suitable teeth that are forcibly locked against the tree truck by an encircling chain or rope that can be tightened by a ratchet, clamp or turnbuckle.

Desirable portable hunting stands must be lightweight with minimum bulkiness for manual transportation. For example, when the primary components of a portable stand are disassembled, it is desirable that they be easily stowed or nested together for carrying, and that the bulk does not present too much of a burden to the hunter when moving through thick brush or heavily wooded areas. However, when a hunting site is reached, the parts must be capable of easy deployment, comfortable maneuvering, and quick erection. Thus a modular design, wherein complementary, easily carried parts, quickly and reliably interfit and mate with one another in a stable, quick-erect fashion, is highly desirable. At the same time, the erected stand must be highly stable and safe.

U.S. Pat. No. 2,855,980, issued Oct. 14, 1958, discloses a portable seat for hunters that folds. A chain is employed to mount or secure the apparatus upon a post or tree.

U.S. Pat. No. 4,120,379, issued Oct. 17, 1978, discloses a portable tree stand and seat that are suspended in horizontal operative positions from a frame work by cables. Suspension cables are fixed to a first end of the framework, wrapped around the tree, and secured to the opposite, second end of the framework.

U.S. Pat. No. 4,236,602, issued Dec. 2, 1980, discloses a tree stand and seat in which the seat and tree stand picot to form a compact package for storage and portage. A belt with a buckle is used to attach the tree stand to the tree.

U.S. Pat. No. 4,722,501, issued Feb. 2, 1988, discloses a tree-mounted bow hanger for temporarily holding a hunting bow. A small diameter steel rod bent at a right angle at the rear end fits into and is retained by a clevis on a ratchet-tightened strap that encircles the tree. The forward end of the rod includes an upwardly angulated tip for retaining the bow in a relatively fixed position. An offset end portion at the rod rear end contacts the tree and maintains the forward end of the rod in a generally horizontal position.

U.S. Pat. No. 5,282,520 issued Feb. 1, 1994 discloses a portable hunting stand that is combined with a wheeled carrier. Separate ladders are hinged together. A wheel is located on a lower ladder and a tree mounting element is disposed on an upper ladder. The upper ladder supports a seat and a standing platform. A ratchet style strap tightener controls a strap mounted to the tree.

U.S. Pat. No. 5,507,362 issued Apr. 16, 1996 discloses a tree stand support that attaches between a tree and the torso of a hunter in a tree stand. An adjustable strap may be tightened by a ratchet mechanism to hold the device to a tree trunk.

U.S. Pat. No. 5,848,666 issued Dec. 15, 1998 shows an adjustable tree stand. A seat assembly is pivotally attached to a support pole for swinging movements through a predetermined arc. The seat assembly includes an apparatus for defining a plurality of intermediate seat assembly positions within the arc and a friction brake device for stabilizing the pivoting movements of the seat assembly.

U.S. Pat. No. 6,003,632 issued Dec. 21, 1999 discloses an adapter for converting a conventional ladder to a tree stand ladder. The ladder elevates a horizontal platform which has a curved portion that engages a tree. At least one ratchet type locking strap secures the adapter and ladder to a tree.

U.S. Pat. No. 6,085,868 issued Jul. 11, 2000 discloses a portable tree stand assembly having a support bracket, a seat, a platform, and a position adjustment arrangement. The seat and platform are pivotally mounted to the support bracket. Adjustments may be made to retain the seat and platform generally parallel to one another irrespective of the lean or angle of a supporting tree.

U.S. Pat. No. 6,185,303 issued Feb. 6, 2001 discloses a strap 1 system that has a ratchet tightener. An adjustable strap attached to a rear surface encompasses a post, and the ratchet tensioning device tightens the strap around the post.

U.S. Pat. No. 6,322,279 issued Nov. 27, 2001 shows an adjustable attachment device for mounting accessories such as a bicycle, ski, or cargo rack, to a frame. The device includes an elongate pin rotatably mounted in a housing to which one end of a strap is attached, the pin having a shaft about which the strap is wound.

U.S. Pat. No. 6,334,508 issued Jan. 1, 2002 discloses a folding hunter stand connected to a first ladder section and a second ladder section rotatably connected to the first ladder section which can be locked in a deployed configuration and fastened to a tree by a ratchet strap that encircles the tree and connects to the stand.

U.S. Pat. No. 6,571,916 issued Jun. 3, 2003 discloses an adjustable hunting tree stand comprising a base, a support, a seat, and a platform. The base and the support axially interconnect for independent rotation about a common axis. The platform and seat attach to opposite ends of the support.

U.S. Pat. No. 6,702,239 issued Mar. 9, 2004 and U.S. Pat. No. 6,880,810 issued Apr. 19, 2005 discloses analogous ratchet strap systems.

U.S. Pat. No. 6,880,810 issued on Apr. 19, 2005, discloses a belt reel for fastening goods on a truck. An axle extends through a main frame and a lever to pivotally mount the main frame and the lever to each other.

U.S. Pat. No. 7,377,361, issued May 27, 2008 discloses a foldable tree stand that has a collapsible platform and seat support assembly. Cables extend between the platform and the seat assembly and are secured using fasteners. The tree stand is secured to a tree or post using a strap with a fastener.

U.S. Pat. No. 7,845,621 issued Dec. 7, 2010 shows a strap tightener system having a rotating axle with a ratchet. A tooth limits and controls ratchet movement. A driving element is mounted on the rotating axle. The driving element has a cam part and a blocking part.

U.S. Pat. No. 8,177,177 issued May 15, 2012 discloses an adjustable mounting system for tree stands that comprises a mounting base, various hooks, and a locking pin. The mounting base is connected securely to a tree using a ratchet strap. The hooks are attached to tree stand or platform, and engage the mounting base. Elongated slots in the base allow the hooks to seat securely to prevent shifting.

U.S. RE 36,276, reissued Aug. 24, 1999, discloses a folding tree stand with a stand portion for releasable attachment to a flexible loop which engages a tree or post.

U.S. patent application Ser. No. 2012/0119044 published May 17, 2012 provides a tree stand hanger for rifles or bows that facilitates temporary hand-free storage, and which allows a hunter quick access. Pivoted apparatus secured to the tree by a cinch strap 1 holds a weapon hook, which swivels horizontally. The rest is suitable for a variety of weapons, and is easily installed or removed.

U.S. patent application Ser. No. 2004/0149871 published Aug. 5, 2004 discloses a deer stand with an adjustable platform secured in position on a tree with heavy duty ratchet straps. A pivoted chair assembly swivels at the end of a support pivot arm. Four quick connect stabilizers fasten between the platform and the main support mount. The stabilizers are anchored and secured with locking pins. Side-to-side movement on the platform is eliminated by the use of a wrap-around end-to-end ratchet strap, which connect from rear corners of the platform to the tree.

SUMMARY OF THE INVENTION

The present invention includes a modular hunter's tree stand that can be carried easily and then quickly deployed. A central vertical support is secured to a tree trunk with a pair of jaws that engage the tree. The jaws each include a ratchet controlled axle that control encircling mounting straps. The ratchet controlled axles are further locked into place once secured to the tree with a mechanical locking feature.

The seat and platform of the tree stand are releasably engaged and quickly secured into position relative to the central vertical support with a spring-loaded, quick-mount clevis system for securing parts together in a "snap-fit" fashion.

The straps used with the tree stand of the present invention do not require any fastening hooks or loops when fastening the tree stand to the tree.

The cables of the tree stand may be replaced as necessary without tools or hardware for preventative maintenance.

The tree stand also includes a spreader bar that allows the tree stand to be adapted to vary the platform pitch by positioning the cable supports in different orientations to accommodate trees of different shapes, independent of the platform and seat of the tree stand.

DETAILED DESCRIPTION OF THE INVENTION

Figure 17:
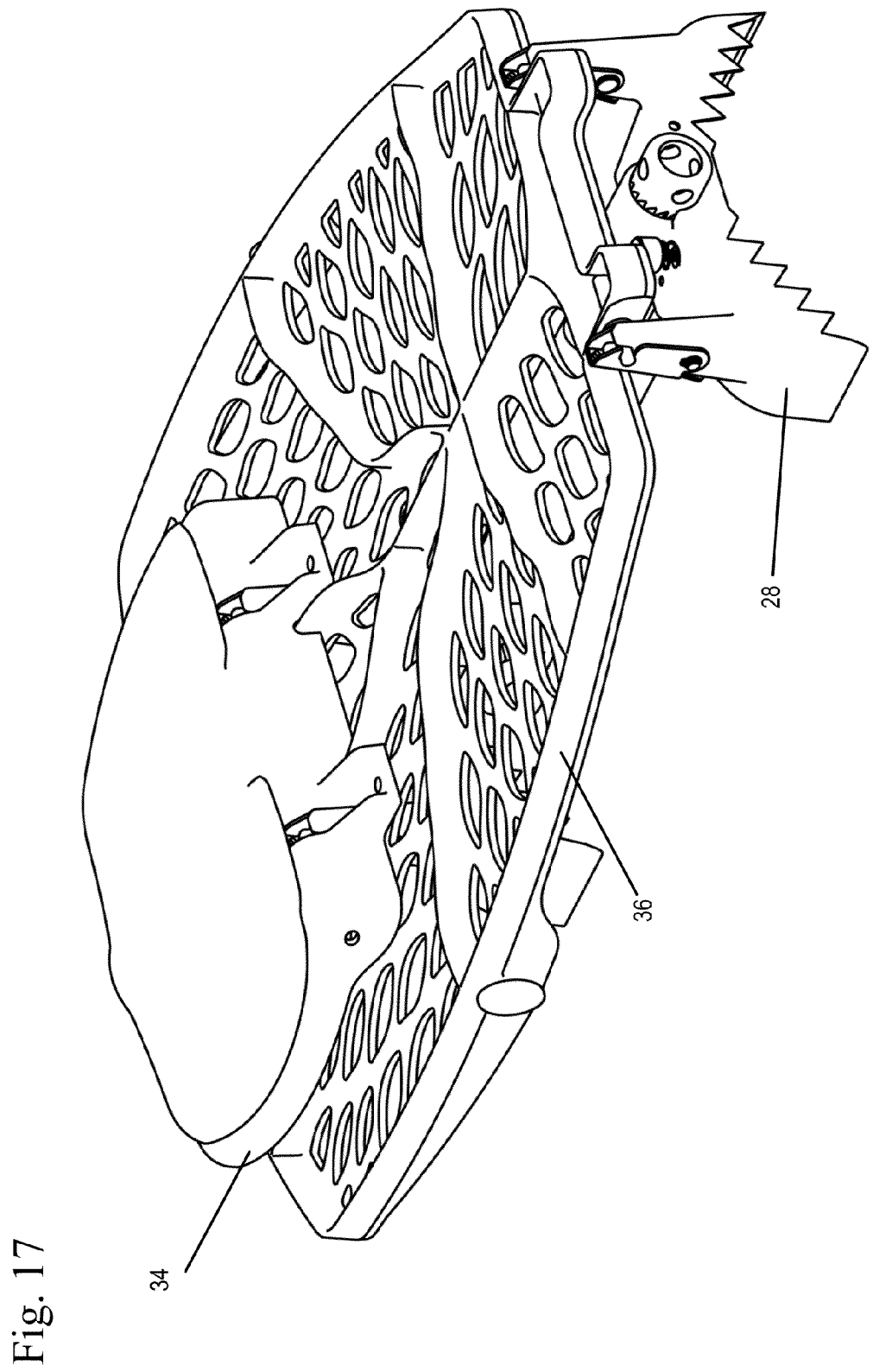
FIG. 17 shows a schematic of the tree stand in a folded position.
Figure 18:
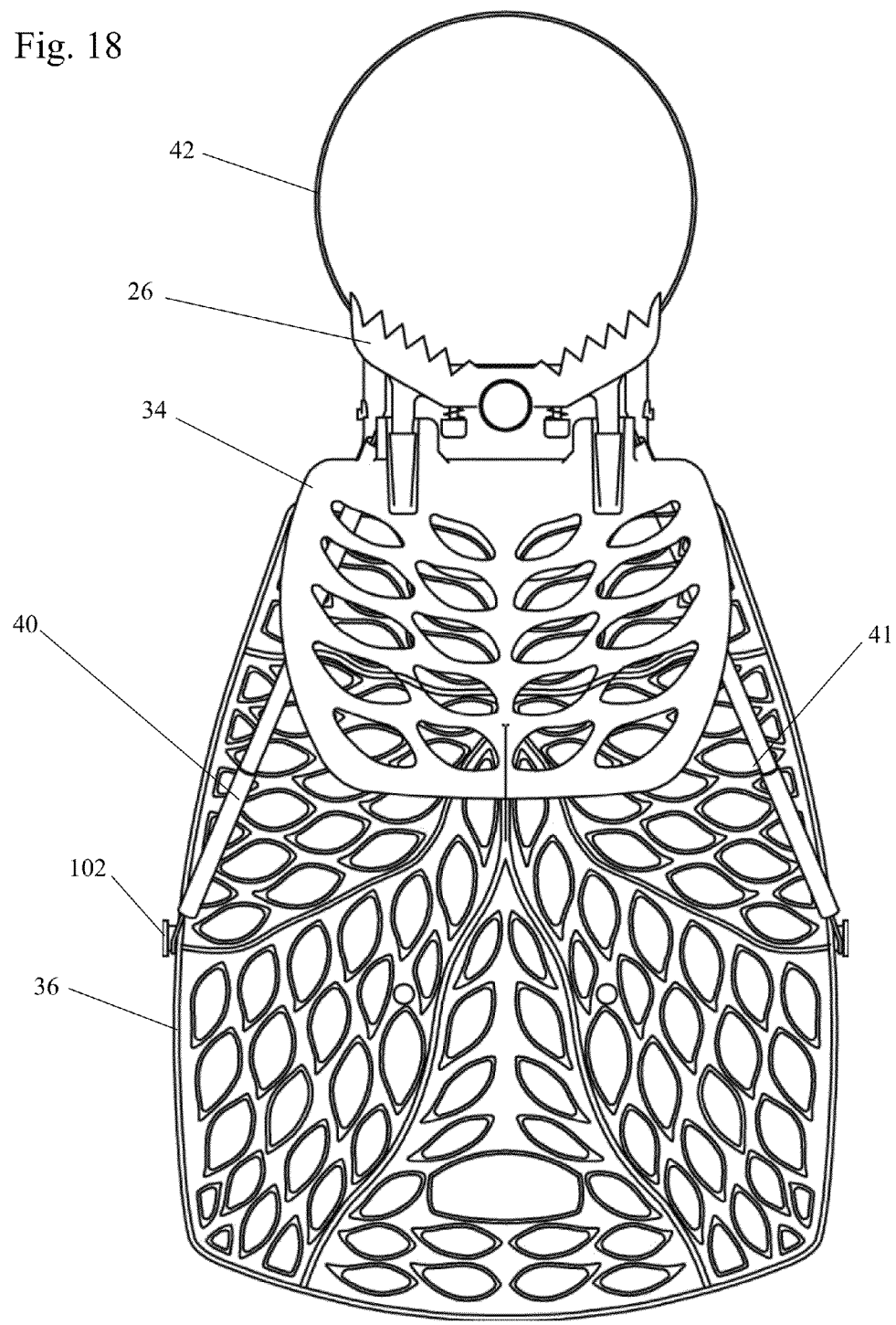
FIG. 18 shows a schematic of a top view of the tree stand.

The modular tree stand 20 of the present invention once carried to desired location for deployment, is quickly mounted to a tree 22, or other generally cylindrical vertical structure, in the manner hereinafter described. The stand 20 comprises several major components that are simply snap-fitted together during erection, or quickly disconnected when the stand is to be stowed or transported as shown in FIG. 17. The various parts are light weight, and non-bulky, so that they may be conveniently carried by a hunter relatively longs distances through heavy brush or thickly forested areas.

Referring to FIGS. 1-5, 7, 10, 14, and 18, a rigid, upright, mounting support bar 24 through an upper jaw 26, an upper strap 42, a lower jaw 28 and a lower strap 44 of a modular tree stand 20 of the present invention is fastened to a tree 22 to secure the stand 20. A seat 34 is removably coupled to and supported by upper jaw 26. For comfort, seat 34 has an optional, removable cushion 35. Similarly, a removable, generally planar, platform 36 is coupled to and supported by lower jaw 28, below the seat 34. Platform 36 may function as a foot rest or a surface for standing.

The generally U-shaped support bar 24 has an upper end 24a, a lower end 24b, a length 24c between the upper end 24a and the lower end 24b, an outer side 24d and an inner side 24e. The curved portion of the U-shaped of the support bar 24 is designated as the outer side 24d. When attached to a tree 22, the inner side 24e of the support bar 24 lies adjacent the tree 22.

An upper jaw 26 is coupled to the upper end 24a of the support bar 24 and a lower jaw 28 is coupled to the lower end 24b of the support bar 24. In a preferred embodiment, the upper jaw 26 and lower jaw 28 are integrally formed with the support bar 24. The support bar 24 is preferably cast of a lightweight metal such as aluminum, although other materials may be used. Upper and lower straps 42, 44 also engage the tree 22 and are controlled by the upper and lower jaws 26, 28. The upper and lower jaws 26, 28 control the upper and lower straps 42, 44 that encircle and grasp the tree 22 when the stand 20 is installed.

Along the outer side 24d of the length 24c of the support bar 24 from the upper end 24a of the support bar 24 to the lower end 24b of the support bar 24 is an upper jaw 26, a first clearance notch 54, a first cutout 58, a slot 84, a second clearance notch 52, a second cutout 59, and a lower jaw 28.

Along the inner side 24e of the length 24c of the support bar 24 from the upper end 24a of the support bar to the lower end 24b of the support bar 24 is the upper jaw 26, a first webbed reinforcement section 51, a series of teeth 53, a second webbed reinforcement section 55, and the lower jaw 28. The first webbed reinforcement section 51 is proximate to the first clearance notch 54 and the second webbed reinforcement section 55 is proximate to the second clearance notch 59.

Figure 1:
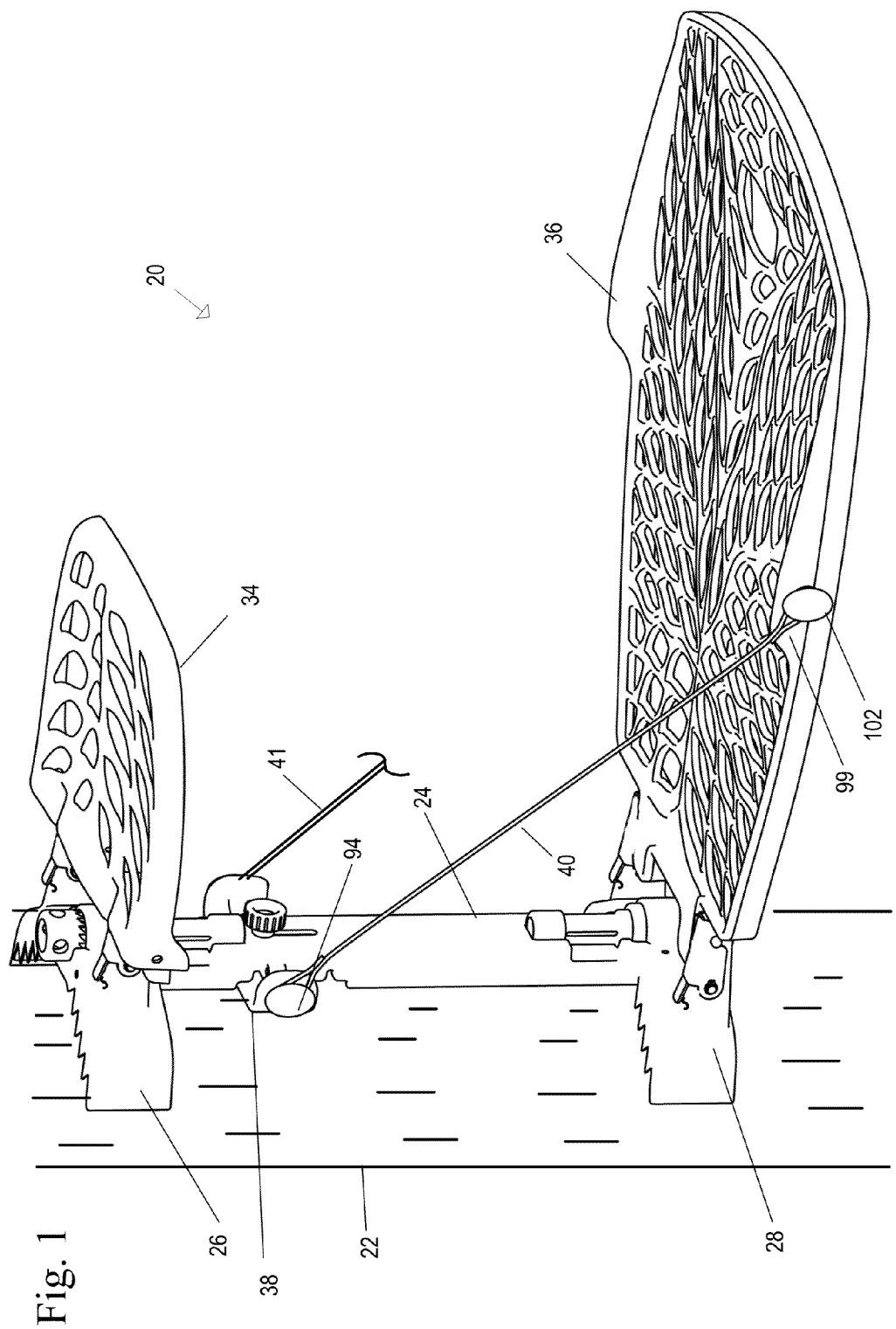
FIG. 1 shows a schematic of a tree stand of the present invention.
Figure 2:
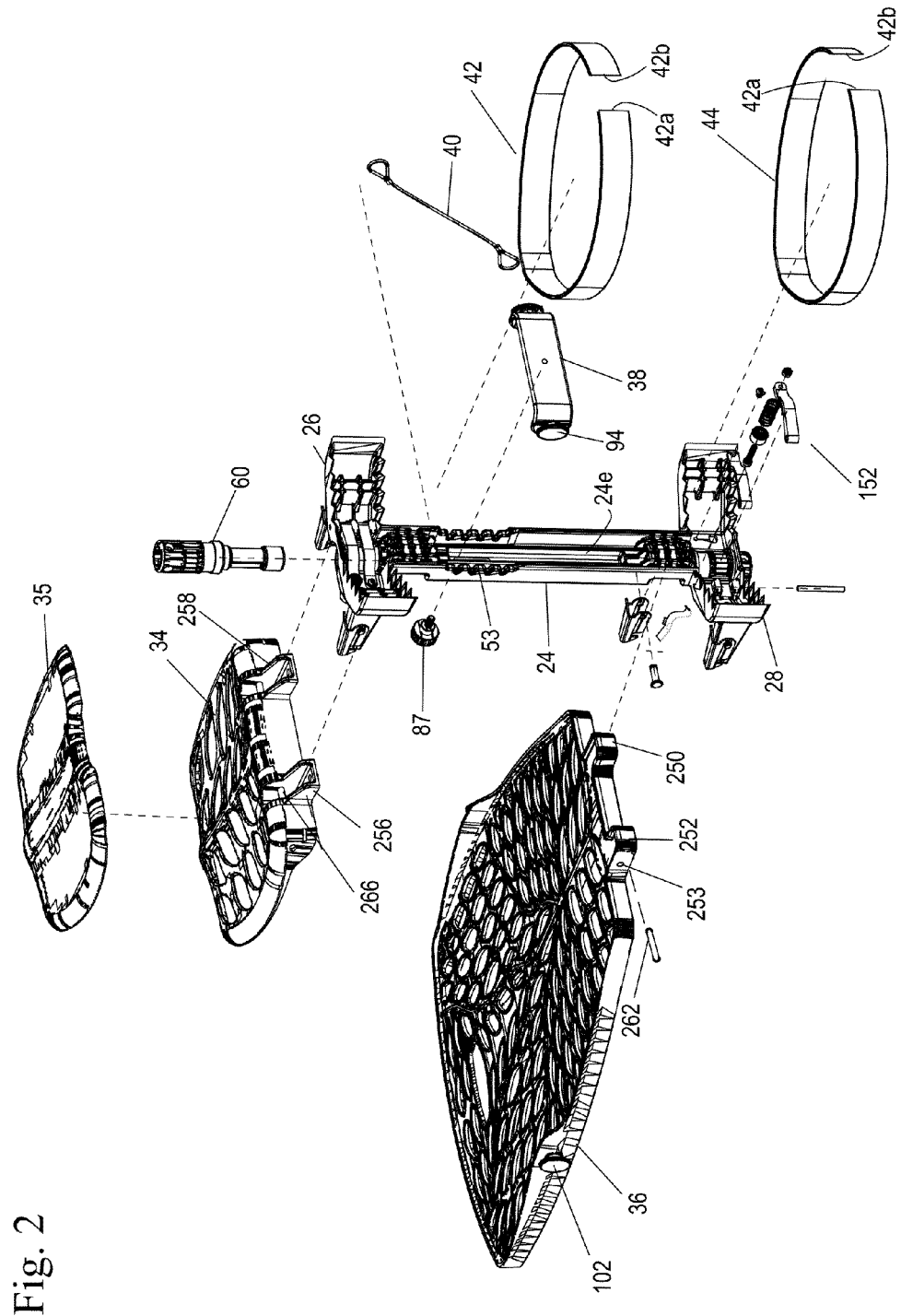
FIG. 2 shows an exploded, rear isometric view of the tree stand.
Figure 3:
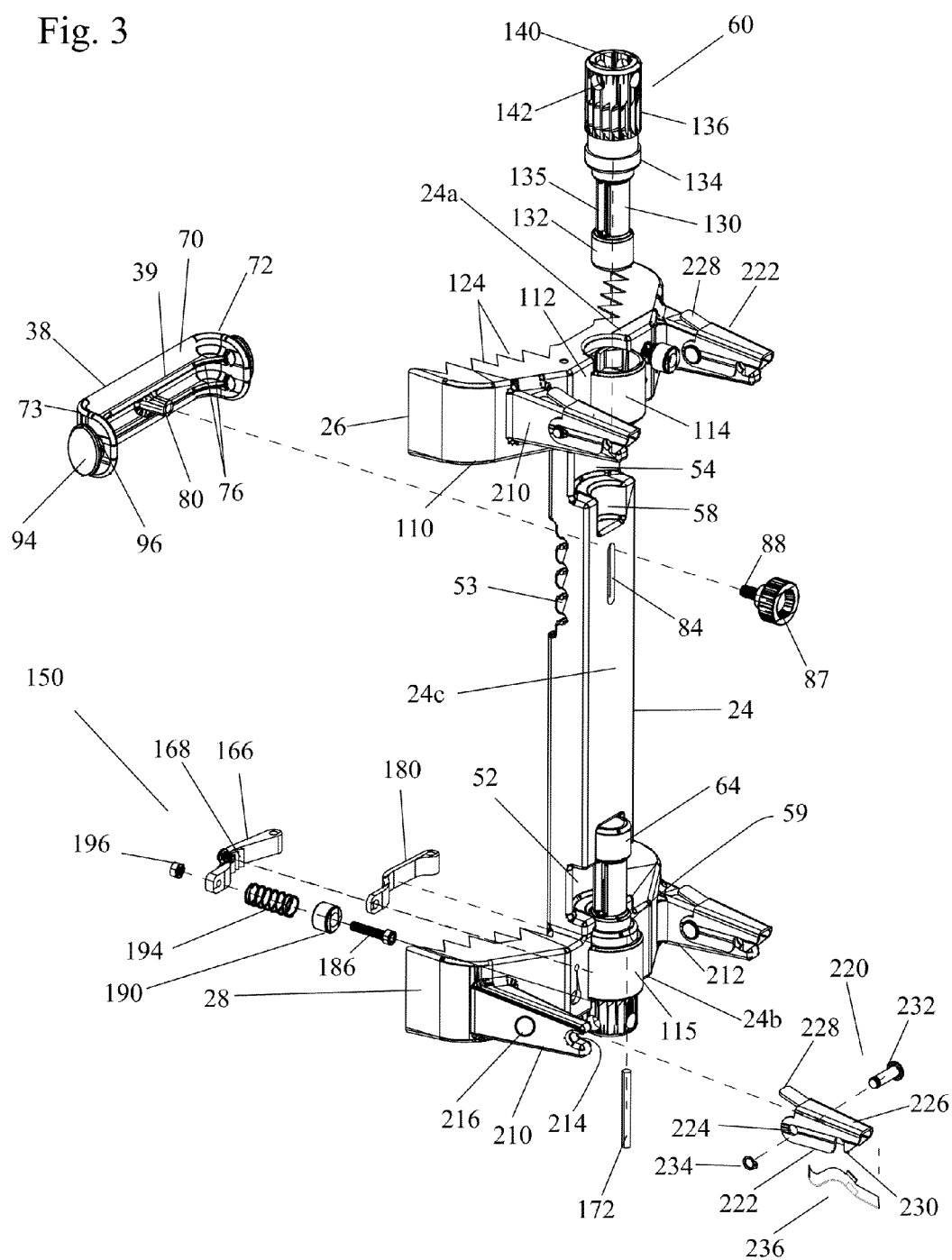
FIG. 3 shows an exploded, isometric view of the support bar of the tree stand.
Figure 4:
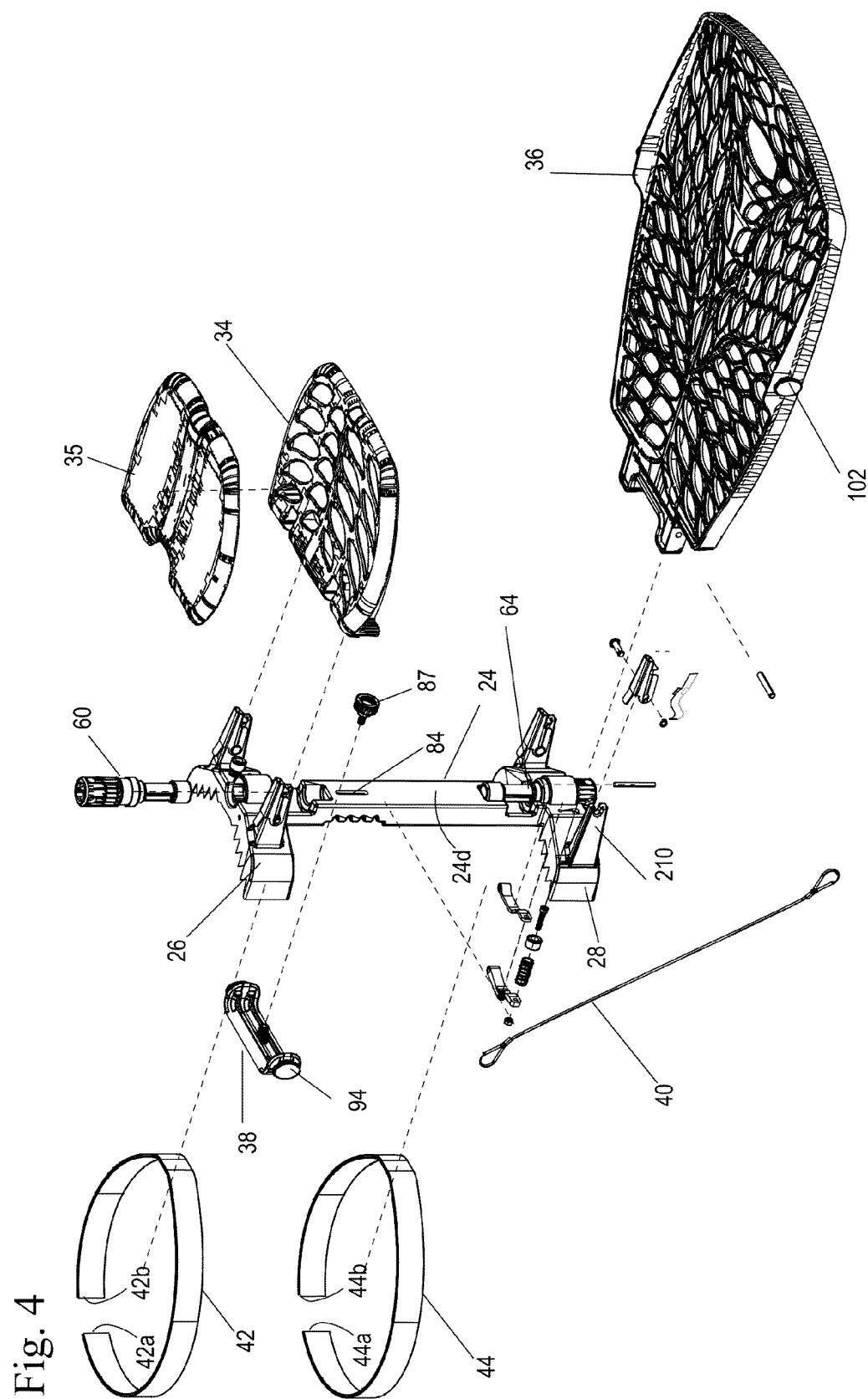
FIG. 4 shows an exploded frontal isometric view of the tree stand.

Referring to FIG. 3, an adjustable, transverse spreader bar 38 has ribs 76 which engage the series of teeth 53 on the second side 24e of the support bar 24 between the upper jaw 26 and the lower jaw 28. The spreader bar 38 is somewhat C-shaped, comprising an elongated body 70 that is integral with a pair of turned ends 72, 73. The ribs 76 strengthen the bar 38. A tubular, projecting socket 80 has a head (not shown) that is slidably captivated within the bar 38 between ribs 76. Socket 80 axially projects outwards from bar 38.

When the spreader bar 38 engages the series of teeth 53 on the inner side 24e of the support bar 24, the socket 80 is received proximate a slot 84, defined by the length of the support bar 24. A manually activated adjustable knob 87 has a threaded shank 88 which penetrates slot 84 and threadably engages socket 80. Since slot 84 is elongated, the bar 38 may be vertically adjusted somewhat when the knob 87 is loose. Further positional adjustments are afforded by the socket 80 which is slidably displaceable relative to the bar 38. Once the bar 38 is favorably positioned, it can be secured by tightening the knob 87.

Each end 72, 73 of spreader bar 38 has a catch 90 that anchors an end of a support cable 40, 41 extending to the platform 36 at a selected angle relative to the support bar 24. Each catch 90 comprises an elliptical or oval head 94 secured to bar 38 by a shaft 96. Support cables 40, 41 have terminal loops 99 at their opposite ends that can be deformed to clear catch heads 94, and engage the inner catch shafts 96 on bar 38. Each side of the platform 36 is provide with a similar catch 102 that anchors the bottom loops of cables 40, 41 to secure the platform 36. Preferably, the elliptical catch heads 94 and heads on platform catches 102 are oriented vertically when the stand 20 is deployed to safely secure the cables 40, 41. The spreader bar 38 allows the tree stand 20 to be mounted to trees of varying shapes, since the spreader bar 38 can vary the pitch of the platform 36 relative to the tree 22.

Figure 5:
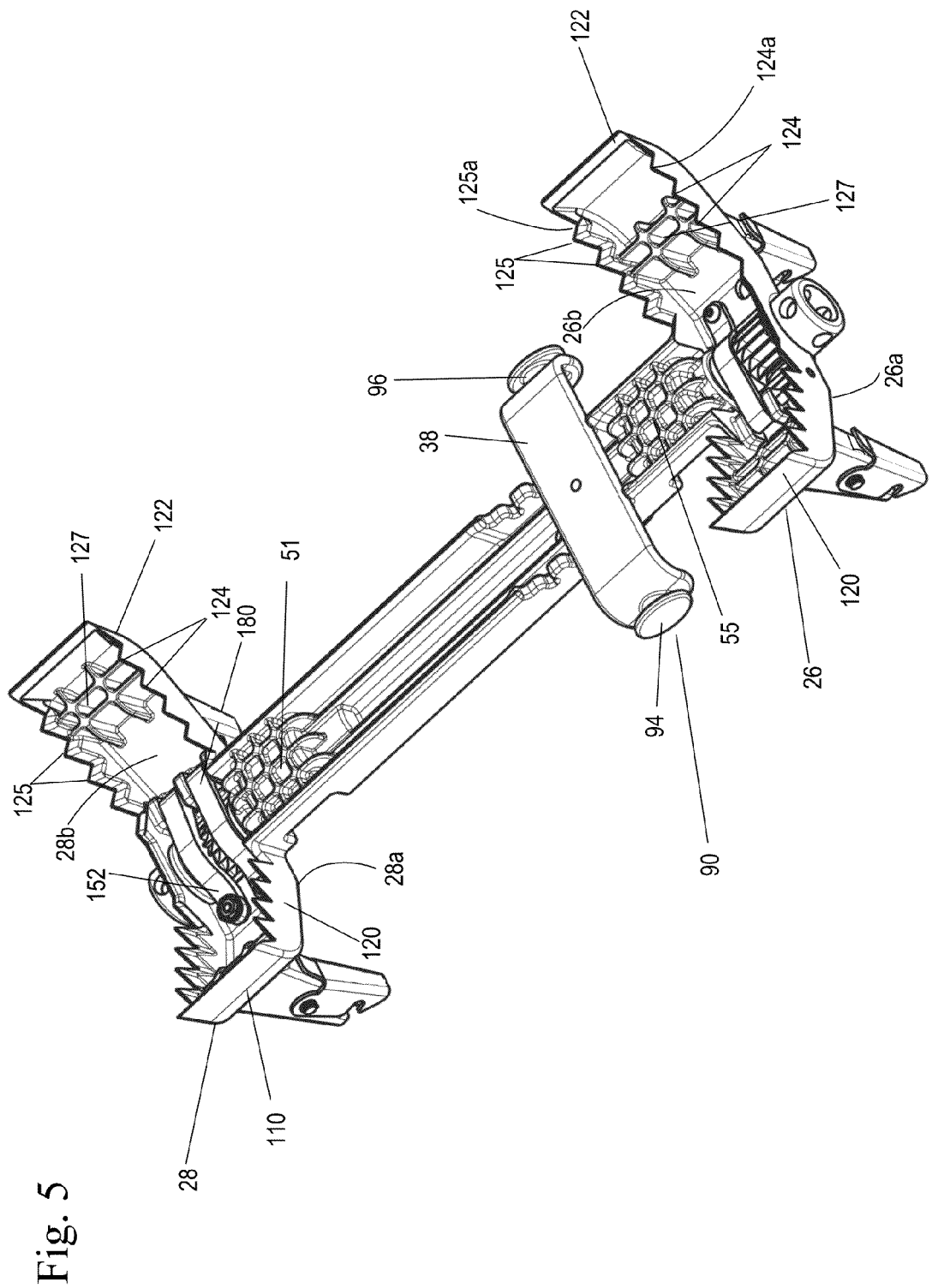
FIG. 5 shows a rear isometric view of the support bar of the tree stand.
Figure 6:
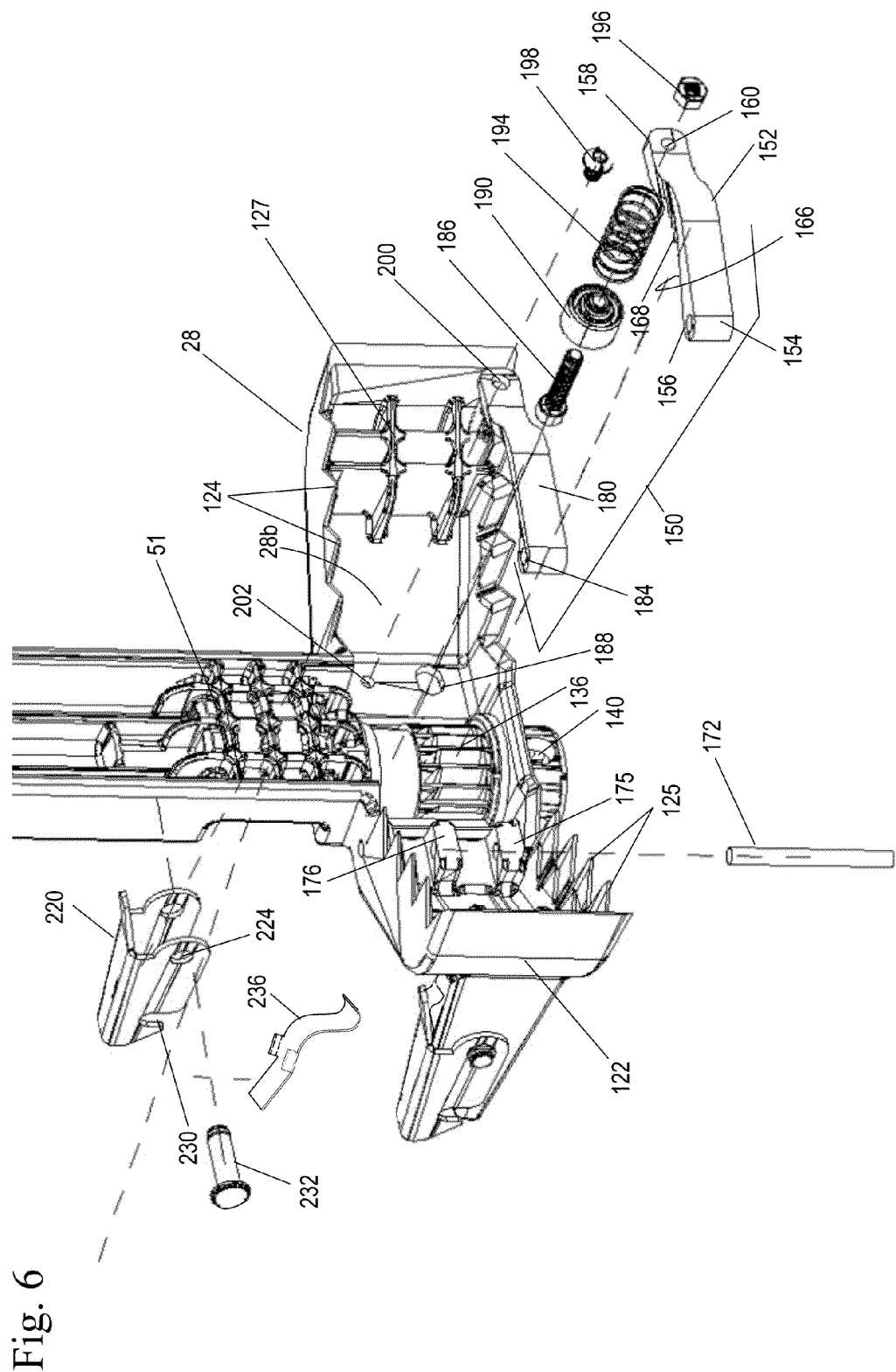
FIG. 6 shows an enlarged view of the lower jaw of the support bar.
Figure 7:
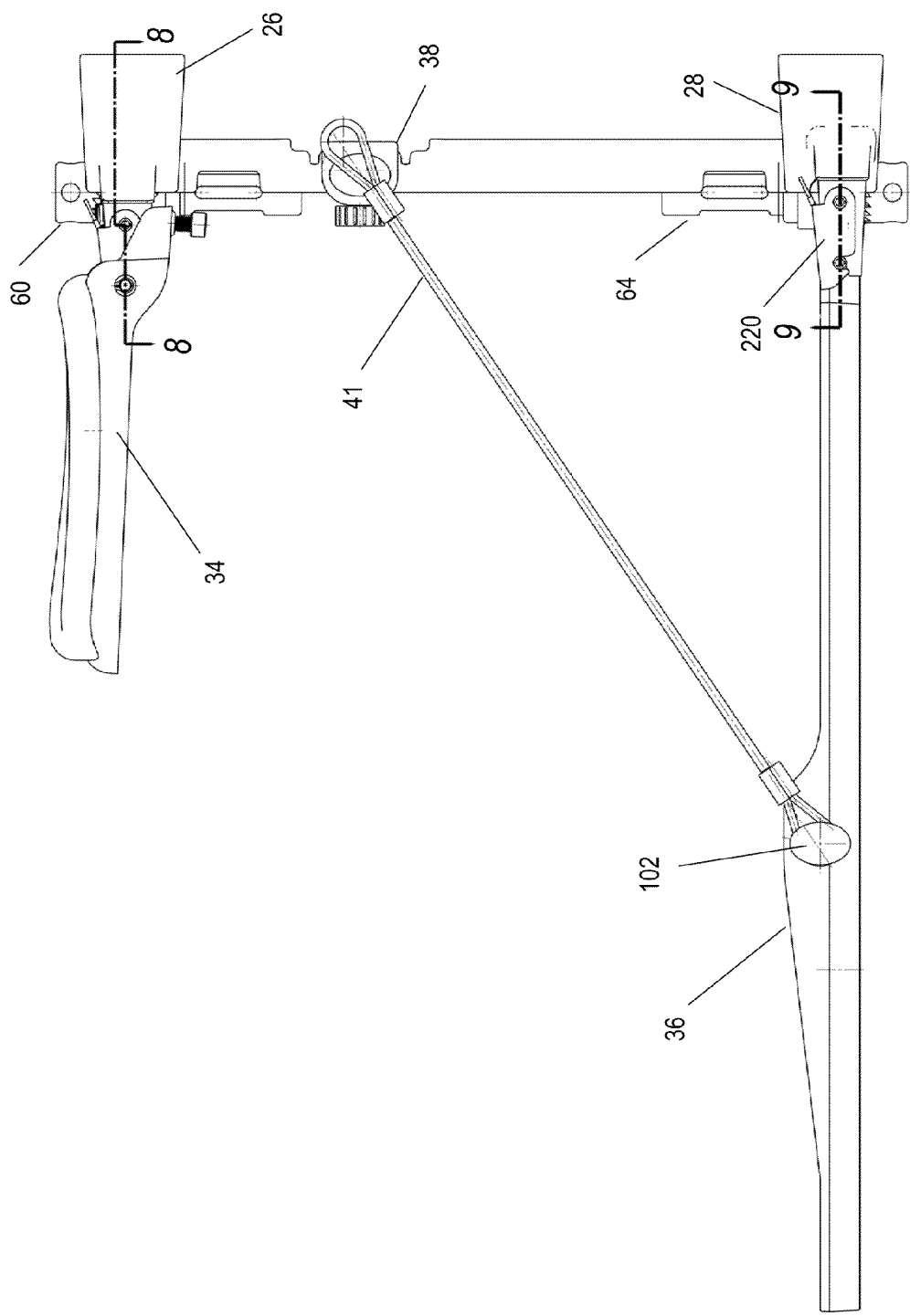
FIG. 7 shows a side view of the tree stand.
Figure 8:
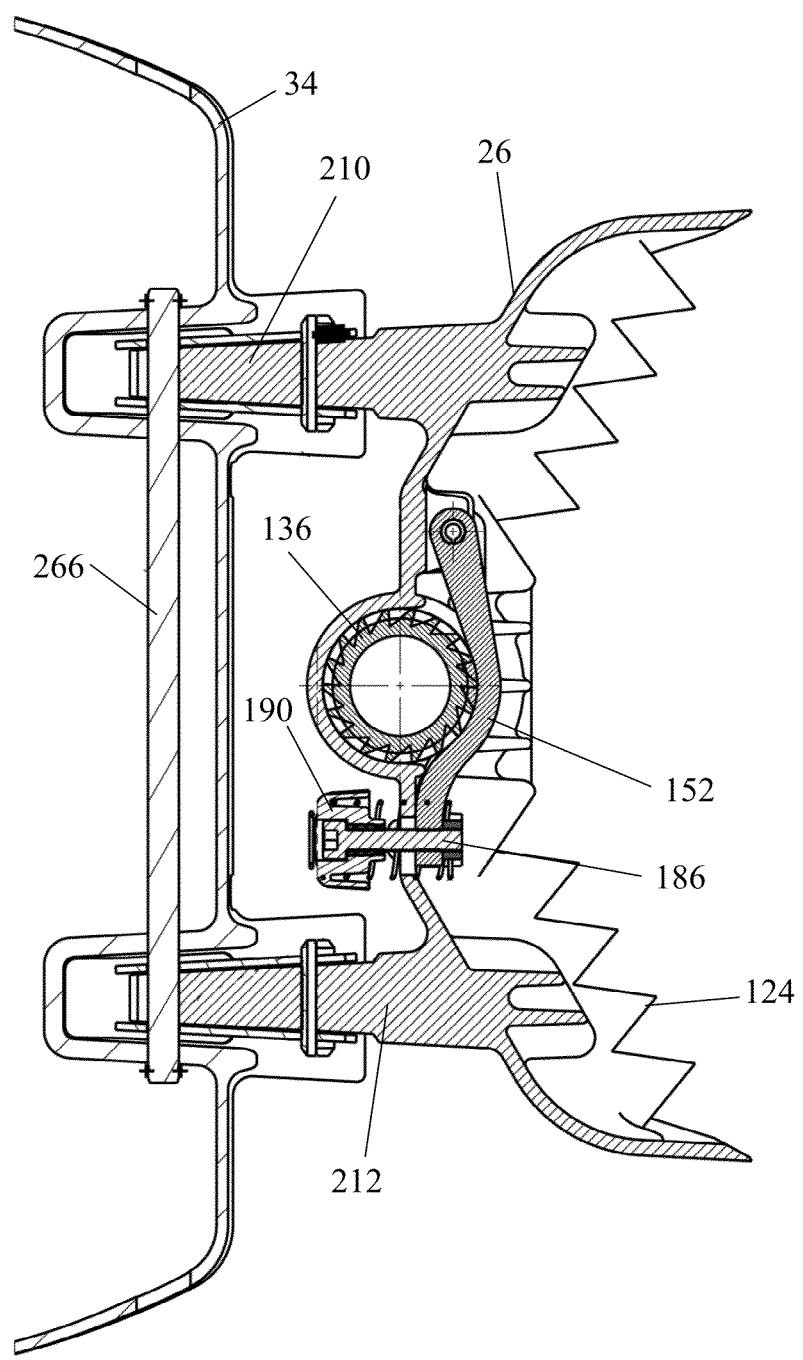
FIG. 8 shows a sectional view of the tree stand along line 8-8 of FIG. 7.
Figure 9:
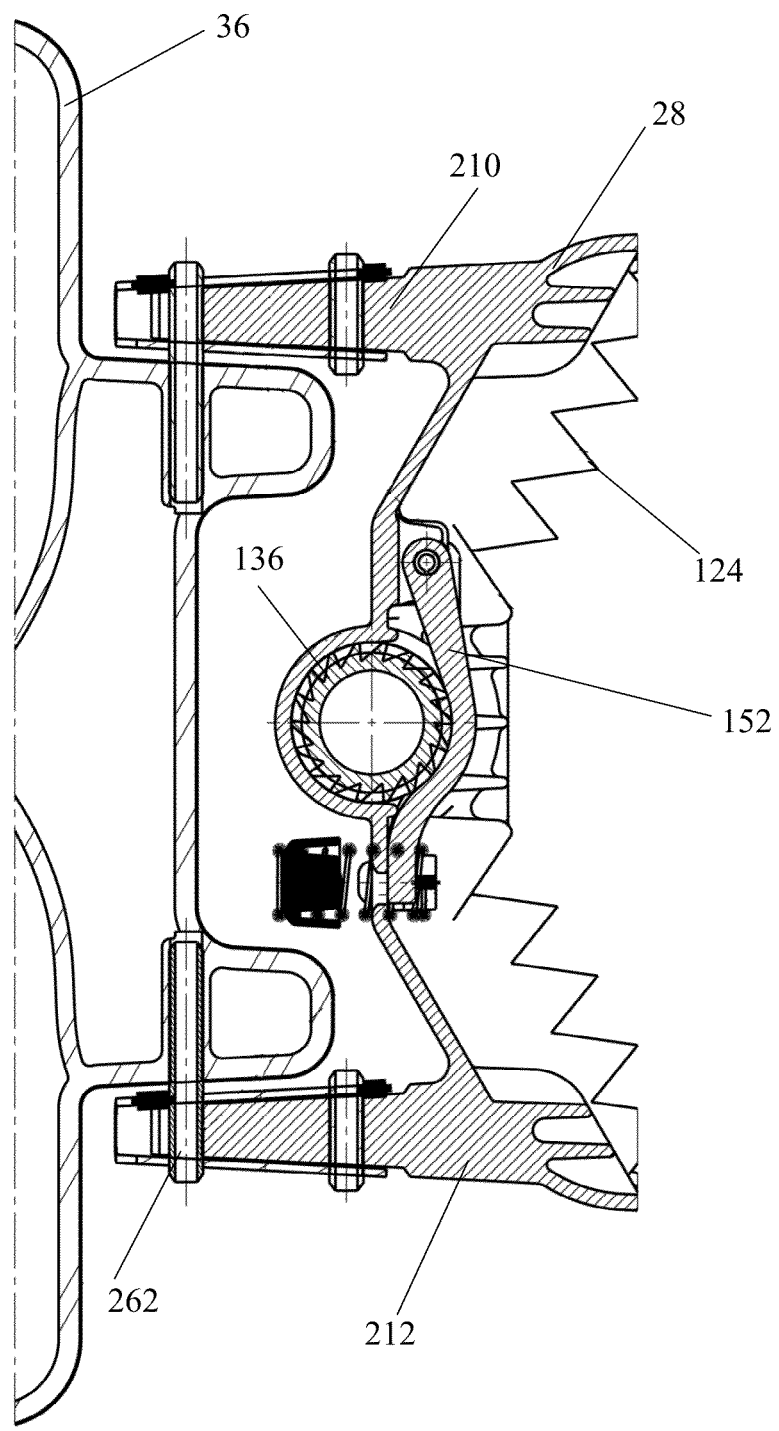
FIG. 9 shows a sectional view of the tree stand along line 9-9 of FIG. 7.
Figure 10:
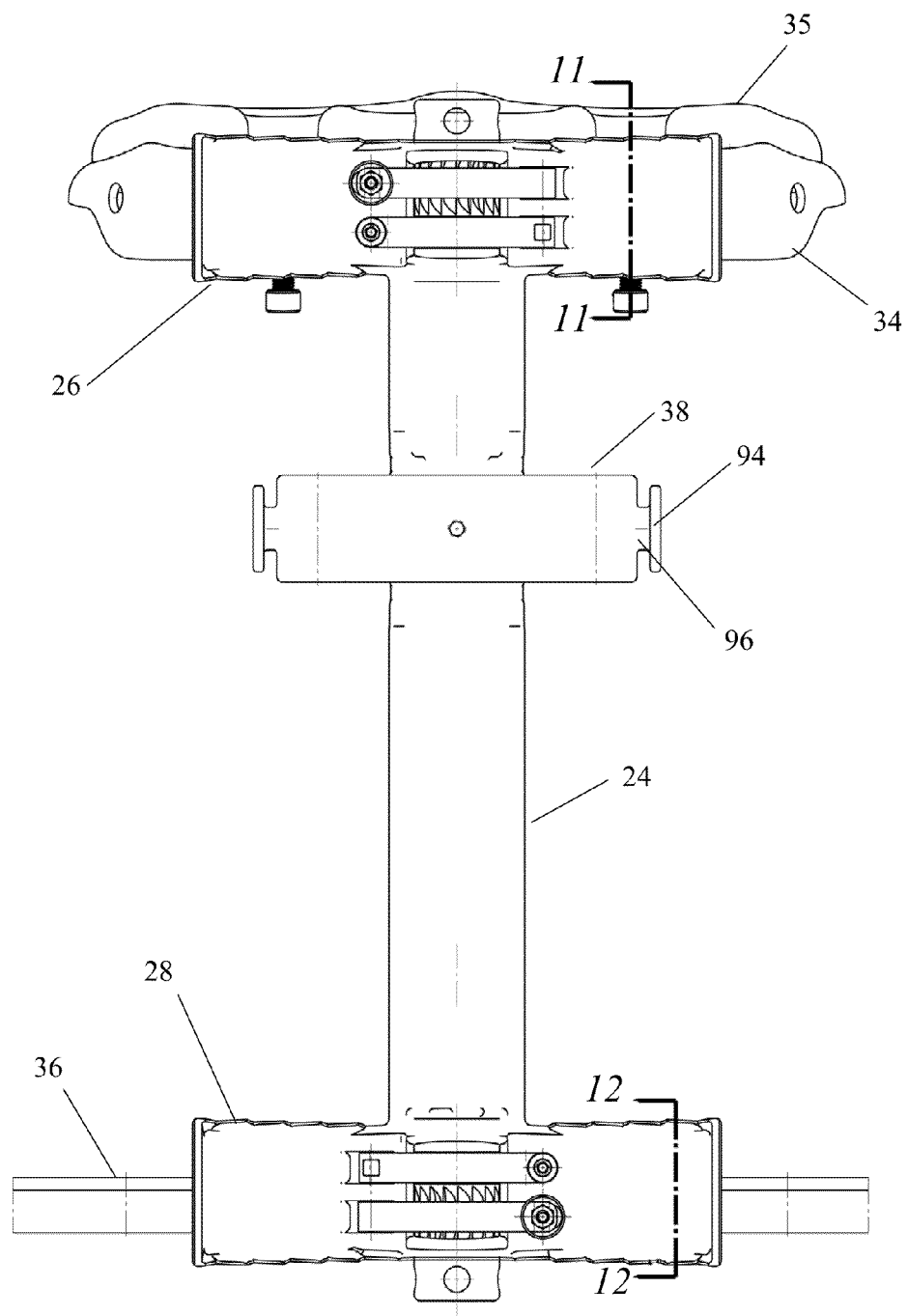
FIG. 10 shows a back view of the tree stand.
Figure 11:
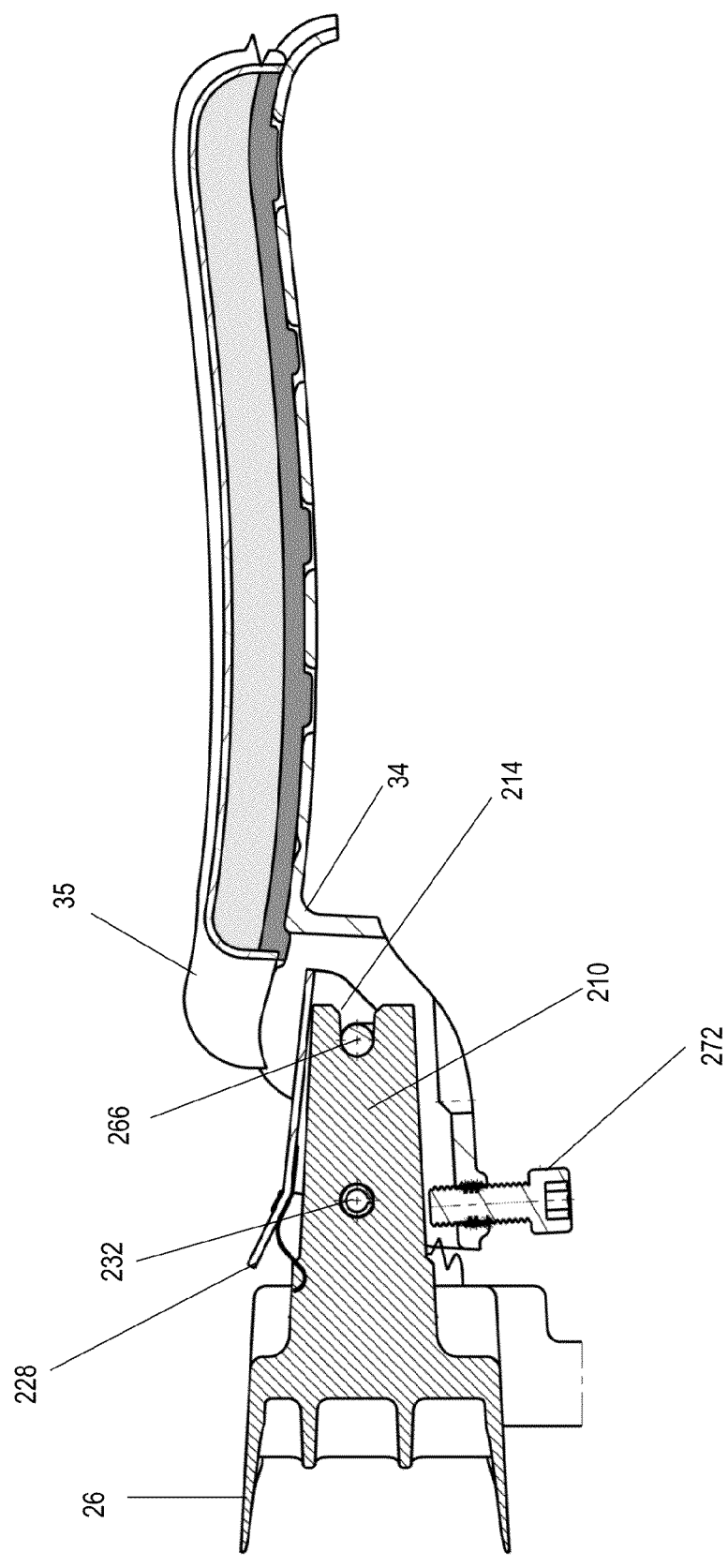
FIG. 11 shows a sectional view of the upper jaw long line 11-11 of FIG. 10.
Figure 12:
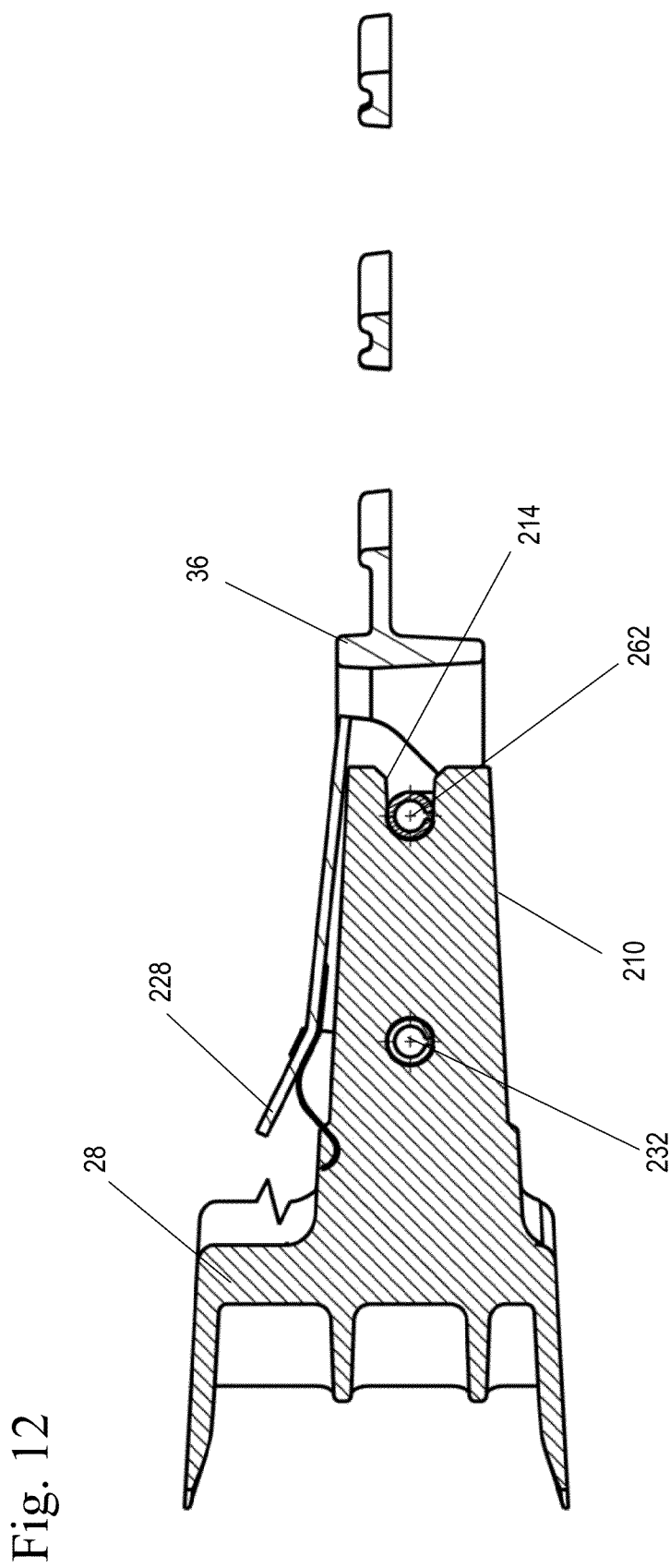
FIG. 12 shows a sectional view of the lower jaw long line 12-12 of FIG. 10.
Figure 13:
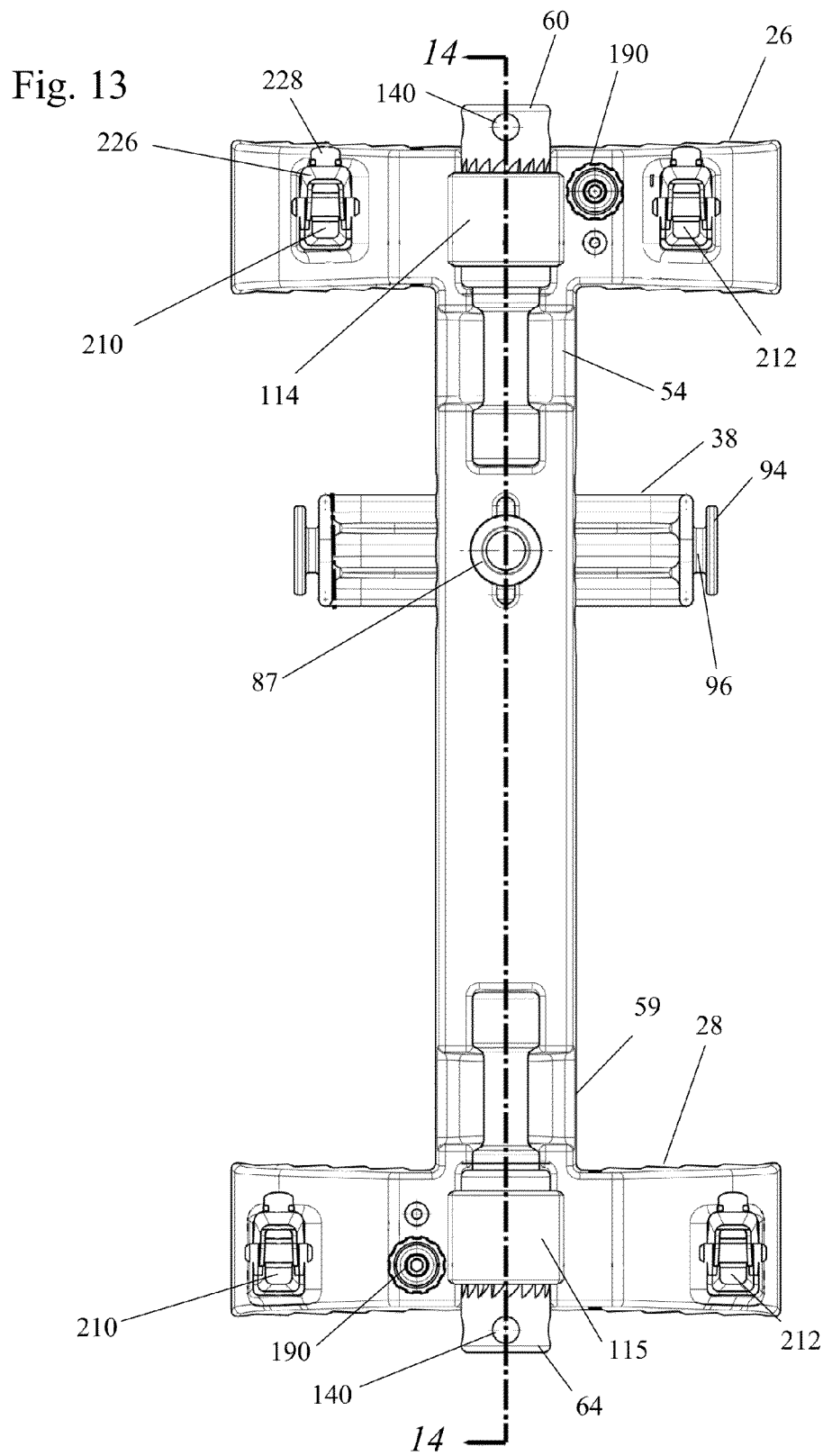
FIG. 13 shows a front view of the tree stand without the platform or seat.
Figure 14:
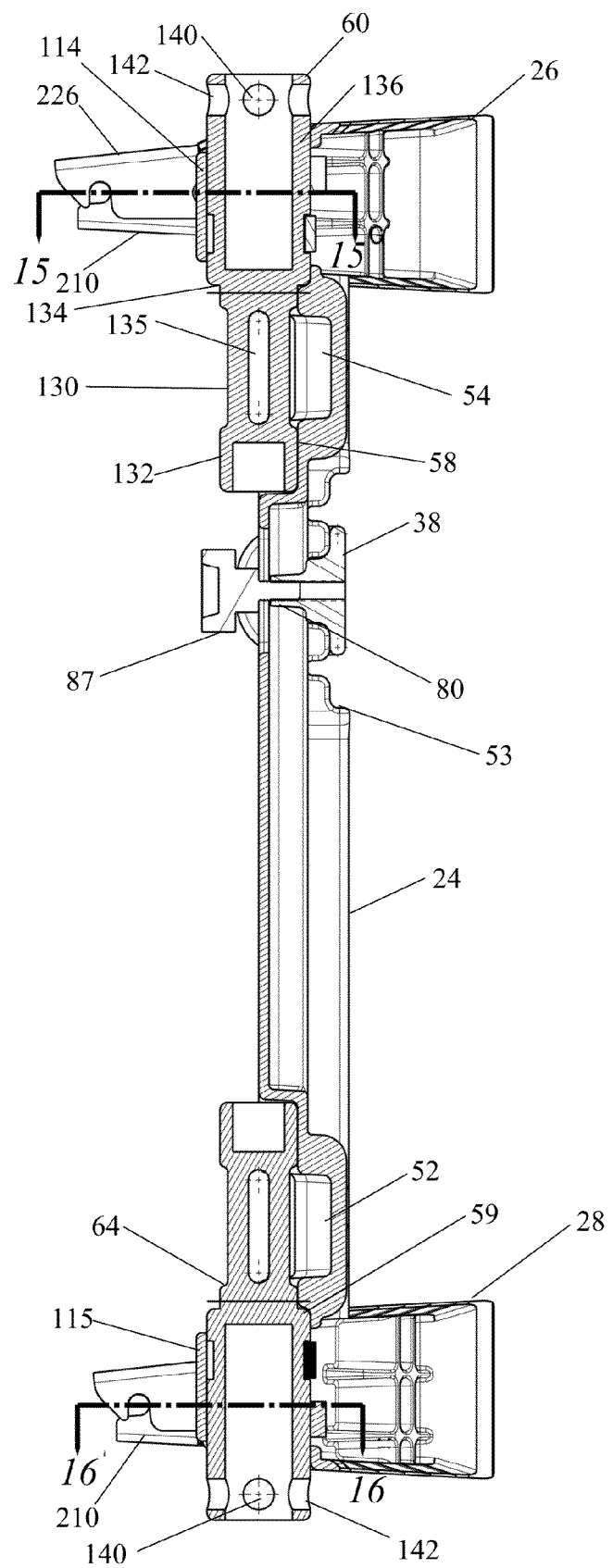
FIG. 14 shows a sectional view along line 14-14 of FIG. 13.
Figure 15:
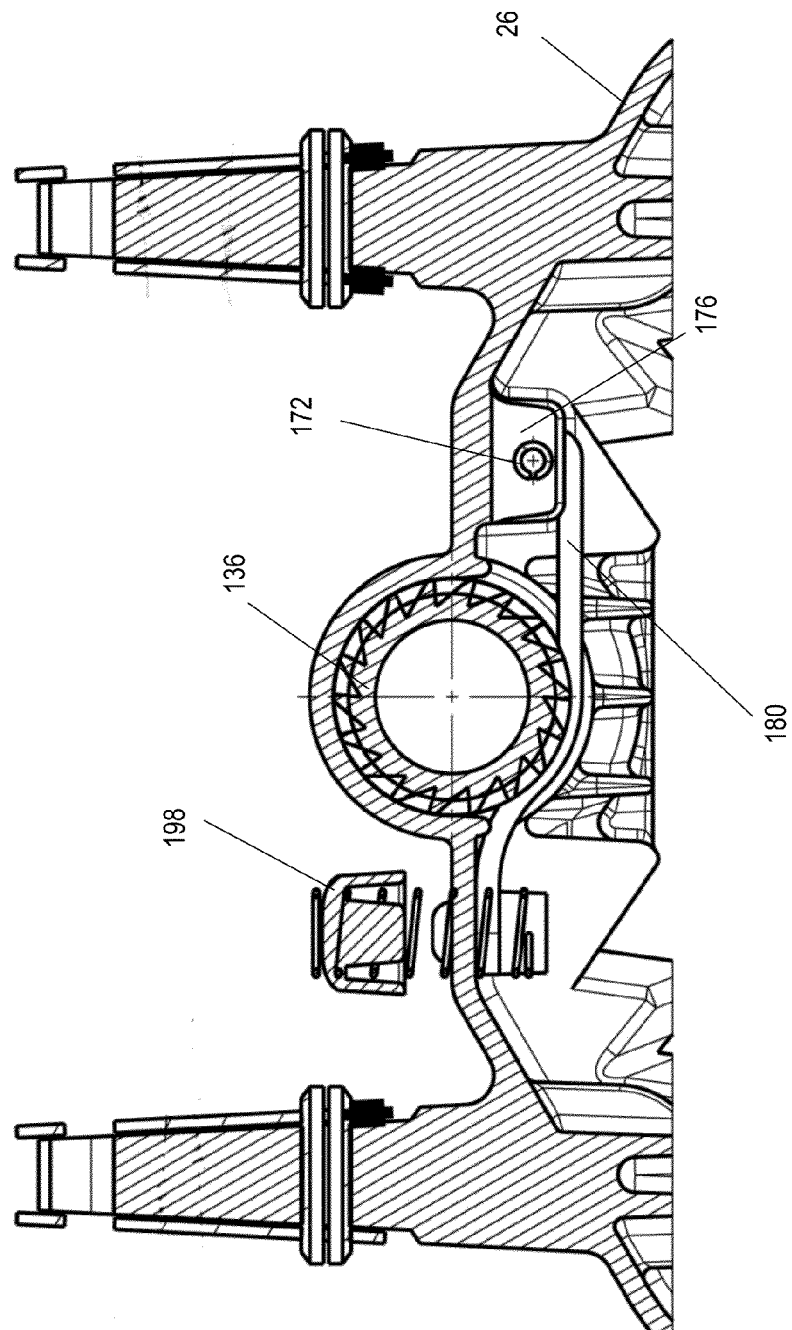
FIG. 15 shows a sectional view along line 15-15 of FIG. 14.
Figure 16:
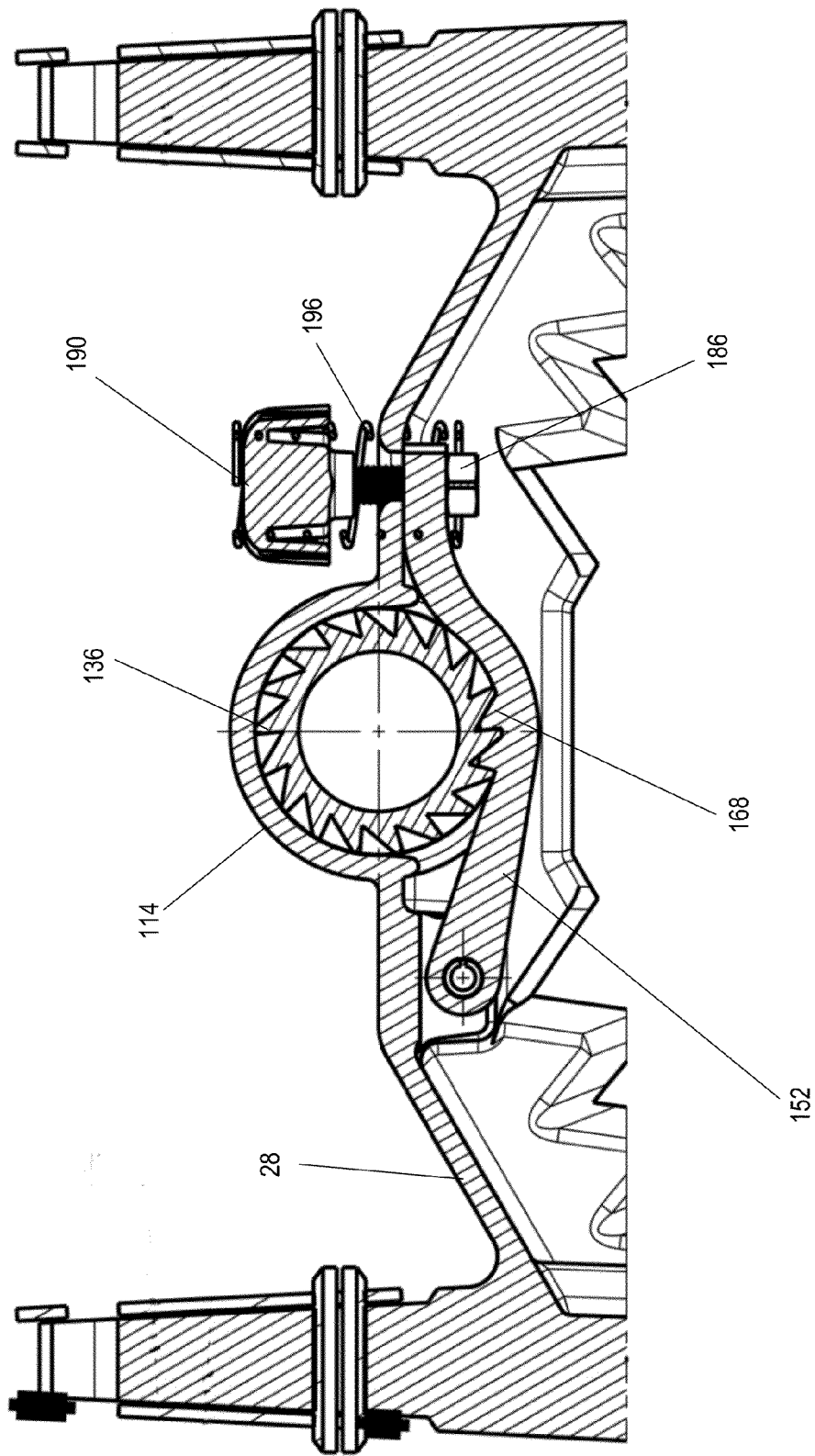
FIG. 16 shows a sectional view along line 16-16 of FIG. 14.

Referring to FIGS. 3 and 5, the upper jaw 26 and the lower jaw 28 each have a rigid, arcuate body 110 with wings 120, 122 that are curved to fit the curve of a tree. The body 110 of the upper and lower jaws 26, 28 has a first or inner side 26a, 28a and a second or outer side 26b, 28b. As with the support bar 24, the second or outer side 26b, 28b of the jaws 26, 28 engages or is adjacent the tree 22. The second or outer side 26b, 28b of the wings 120, 122 of the body 110 has a first set of spaced apart teeth 124 on a top surface 124a and a second set of spaced apart teeth 125 on a bottom surface 125a that engage the tree 22. The wings 120, 122 of the body 110 are reinforced through web sections 127 for strength.

The first or inner side 26a, 28a of the body 110 of the upper jaw 26 and the lower jaw 28 each has a gudgeon 114, 115 for receiving a strap control axle 60, 64. The gudgeon 114 of the upper jaw 26 is aligned with the first clearance notch 54 and the gudgeon 115 of the lower jaw 28 is aligned with the second clearance notch 59. The strap control axles 60, 64 are received within their respective gudgeons 114, 115 and seat in their respective clearance notches 54, 59. The strap control axles 60, 64 have toothed sections 136 that are accessible between the wings 120, 122 of the upper and lower jaws 26, 28 on the second side 24e.

The strap control axles 60, 64 used for the upper and lower jaws 26, 28 are identical. Each of the strap control axles 60, 64 are journalled for rotation within the gudgeons 114, 115, and a corresponding aligned clearance notch 54, 59. Each axle 60, 64 comprises a rigid shaft 130 that supports an integral, terminal bearing 132 received within the clearance notches 54, 59. Shaft 130 also mounts an intermediate bearing 134 proximate a tubular, toothed ratchet wheel 136 that interacts with pawl structure 150. A first end of the straps 42a, 44a are attached to strap control axles 60, 64 via through slots 135 in the shaft 130 of the axles 60, 64. The second end of the straps 42b, 44b are wrapped around the tree and secured by returning through the slots 135 in the shaft 130 of the axles 60, 64 such that the straps ends overlap. The first end of the straps 42a, 44a preferably have a buckle (not shown) to prevent the strap from pulling through the slot 135 in the axles 60, 64.

The toothed ratchet wheel 136 includes a pair of through bores 140, 142 transverse to a longitudinal axis of the axle that permit rotational adjustments with a suitable tool, like a rod, screw driver or the like. The toothed ratchet wheel 136 of each strap control axle is mechanically contacted by a pawl structure 150 for controlling the strap control axles 60, 64.

Referring to FIGS. 3, 3, 8, 9, 15, and 16, the pawl structure 150 includes a pawl 152 with a rigid, generally rectangular shape having a first end with reinforced swivel end 154 with a mounting orifice 156 a second, opposite end 158 with an orifice 160.

The pawl 152 has several rigid teeth 168 that engage the toothed ratchet wheel 136 to lock the rotation of the strap control axles 60, 64 relative to the support bar 24. The pawl 152 is secured to an interior surface on the second side 26b, 28b of the jaws 26, 28 formed between the wings 120, 122 through insertion of a pivot rod 172 through a pair of spaced apart, apertured bosses 175, 176 integrally defined within wing 122 and the mounting orifice 160 of the pawl 152.

Pivot rod 172 also secures a keeper 180 that is shaped like pawl 152 but lacks teeth. The pivot rod 172 is also received by an orifice 184 of the keeper 180, allowing rotational movement of the keeper above boss 176. The keeper 180 is secured to the jaws 26, 28 by a screw 198 that penetrates an orifice 200 of the keeper 180 and anchors within orifice 202 of the jaws.

The pawl structure 150 also comprises a ratchet safety screw 186 that penetrates a slotted orifice 188 between the wings 120, 122 of the jaws 26, 28, securing a ratchet safety knob 190 that, in assembly is accessible from the first side 26a, 28a or front of the jaw 26, 28. Screw 186 coaxially penetrates a spring 194 and orifice 160 in pawl 152 and is terminated by a nut 196. The ratchet safety screw 186 ensures that the teeth 168 of the pawl 152 remain engaged with the toothed portion 136 of the strap control axles 60, 64.

Once a strap 42, 44 has been wrapped around the tree 22, the straps 42, 44 may be tightened and secured into place by engaging the bores 140 and 142 of the strap control axles with screw driver, rod, causing the pawl 152 to ratchet with the teeth 136 of the strap control axle 60, 64 until the strap control axle 60, 64 will not turn any further or the pawl 152 cannot engage or jump to the next tooth 136 on the strap control axle 60, 64.

Referring to FIGS. 3, and 8-16, the seat 34 and the platform 36 of the tree stand 20 are releasably quick connected to the upper and lower jaws 26, 28 of the support bar 24 through engagement of a snap lock 220 with an outwardly projected arm of the jaws. Seat 34 is connected to the upper jaw 26, and platform 36 connects to the lower jaw 28.

The seat 34 and platform 36 are connected to the upper and lower jaws 26, 28 by a pair of outwardly projecting, spaced apart tongues or arms 210, 212 (FIG. 3) that are generally triangular in profile. Each protruding tongue 210, 212 has a frontal notched mouth 214 and a spaced apart transverse bore 216. A pivoting snap lock 220 is mounted over each tongue to complete the quick connect apparatus. Each snap lock 220 comprises a pair of generally triangular, spaced apart sides 222 with rear apertures 224 and front, lower locking notches 230 defined therebetween. An integral top 226 extends between the sides 222 and includes a rear actuation tab 228. The snap locks 220 fit over tongues 210, 212, and are pivotally secured by a screw 232 that extends through snap lock orifices 224 and tongue orifices 216, being secured by a nut 234. A spring 236 is placed within the snap lock 220 during assembly and biases the snap lock closed, such that snap lock notches 230, covers and blocks tongue mouths 214. The spring 236 may be a linear spring, a formed spring as shown in the figures or also a torsion spring. Tab 228 may be depressed manually against yieldable bias from spring 236 to open the snap locks, exposing mouth 214 when a seat 34 or platform 36 is to be disconnected from the support bar 24.

Both the seat 34 and platform 36 include a rear structure that is coupled to, and captivated by, the quick connection apparatus. Viewing FIG. 2 for example, the platform 36 has a pair of rigid, spaced apart rear bosses 250 and 252 with aligned orifices 253. Similarly, the rear of the seat 34 has a pair of apertured bosses 256, 258 with aligned orifices 259. A dowel pin 262 is press fit between bosses 250 and 252, and a similar pin 266 is press fit between bosses 256 and 258. These pins 262, 266 are selectively captivated within the quick connect coupling apparatus discussed above. Specifically, when the snap lock 220 is opened by depressing tab 228, the channeled mouth 214 of the arms 210, 212 are exposed, and the pins 262 rest within them, and are captivated when the snap locks 220 are closed by spring pressure after releasing tabs 228. Snap locks 220 are held closed with spring force provided by spring 236. Pins 262 can only be removed upon applying downward force on tab 228, and thus removing the platform 36 or the seat 34 from the channeled mouth 214.

It should be noted that the angle of the seat 34 may be adjusted by altering the position of the screw 272.

To remove the seat 34 from the support bar, the tab 228 is depressed, opening the channeled mouth 214 of the arms 210, 212 such that the pin 262 is removed from the channeled mouth 214.

The platform 36 is removed by vertically raising the platform 36 to be relatively parallel to the support bar 24, allowing the end loops 99 of the cables 40, 41 to be moved into alignment with a major diameter of the catch head 94, 102 and removed from the catch head 94, 102. The platform 36 is then removed from engagement with the support bar 24 by depressing tab 228, opening the channeled mouth 214, such that pins 262 are removed.

To install the tree stand onto a tree 22, the platform 36, cables 40, 41, and seat 34 are preferably removed as described above. The ends of the straps 42, 44 are threaded through the slots 135 in the strap control axles 60, 64 and wrapped around the tree 22. The straps 42, 44 are tightened through manual adjustment by the user pulling the straps tight around the tree 22. The straps are then tightened and secured into place by engaging the bores 140 and 142 of the strap control axles 60, 64 with screw driver, rod, causing the pawl 152 to ratchet with the teeth 136 of the strap control axles 60, 64 until the strap control axles 60, 64 will not turn any further or the pawl 152 cannot engage or jump to the next tooth 136 on the strap control axle 60, 64. Ratchet safety screw 186 is also tightened through knob 190. The spreader bar 38 may then be adjusted to engage the tree through tightening both knob 87, and an auxiliary locking screw 89.

After the support bar 24 is affixed in place on the tree, the platform 36 is reattached to the support bar 24 by easing the pins 262 into the channeled mouth 214. The cables 40, 41 are reattached by raising the platform 36 to be generally parallel to the support bar 24, allowing the ends 99 of the cables 40, 41 to be aligned with the major diameter of the oval catch heads 94, 102. Once the loops are placed over the catch heads 94, 102, the platform 36 is lowered back into a position perpendicular to the support bar 24. If the user wishes to use the seat 34, the seat 34 is reattached to the support bar 24 by easing the pins 266 into the channeled mouth 214.

To remove the tree stand from a tree, the seat 34 is removed from the support bar 24 by depressing the tab 228 and opening the channeled mouth 214 of the arms 210, 212 such that the pins 266 are removed from the channeled mouth 214. The platform 36 may then be raised vertically or relatively parallel to the support bar 24, allowing the end loop 99 of the cables 40, 41 to be moved into alignment with a major diameter of the catch heads 94, 102 and removed from the around the catch heads 94, 102. The platform 36 may also be removed from engagement with the support bar 24 by depressing tab 228, opening the channeled mouth 214, such that pins 262 are removed. The ratchet safety screw 186 is loosened through the knob 190 and the toothed ratchet wheels 136 are loosened by using a suitable tool, like a rod, screw driver or the like in the bores 140, 142 transverse to a longitudinal axis of the axle, loosening the straps 42, 44 and allowing the straps 42, 44 to be removed from the tree 22 and the support bar 24 removed from the tree 22.

The tree stand of the present invention may be easily collapsed into a folded form that easy for a hunter to carry and transport. The tree stand preferably weighs no more than 19 lbs. The collapsed position is shown in FIG. 17.

To fold the stand into the collapsed position after the stand has been removed from the tree, the seat 34 and platform 36 are preferably removed from engagement with the support bar 24 as described above. The platform 36 is then fitted against the outer side 24d of the support bar 24, such that the arms 210 and the snap locks 220 of the upper jaw 26 fit through slots of the platform 36. Then, a bottom of the seat 34, opposite the side that may receive the removable cushion 35 is placed facing the platform 36, such that the snap locks 220 and arms 210 of the upper jaw 26 can engage the pins 266 of the seat 34 with the snap locks 220 and arms 210, locking the seat 34 and the platform 36 to the support bar 24 for easy carrying and transport.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tree stand for removable attachment to a tree comprising:
    a) a support bar having an upper end and a lower end with a length therebetween;
    b) an upper jaw coupled to the upper end of the support bar and a lower jaw coupled to the lower end of the support bar, each jaw comprising:
        i) a curved body having an inner side with teeth for gripping a tree and an outer side;
        ii) a pair of arms extending outwardly from the outer side of the curved body, each arm comprising:
            A) a body having a first end attached to the outer side of the curved body and a second end having an outward-facing notch;
            B) a pivoting snap lock mounted and secured on the body:
        iii) a gudgeon for rotationally receiving a strap control axle, centered on the outer side of the curved body between the arms, having an inner bearing for receiving a shaft;
        iv) a strap control axle comprising the shaft received within the inner bearing of the gudgeon and a toothed ratchet wheel mounted to the shaft and extending outwardly from the gudgeon;
        v) a toothed pawl mounted to the inner side of each of the curved body of each jaw, located such that the toothed pawl engages the toothed ratchet wheel of the strap control axle; and
    c) a platform mounted to the outer side of the lower jaw by insertion of a set of protrusions on the platform into the pivoting snap locks of the arms of the lower jaw.

2. The tree stand of claim 1, further comprising a seat mounted to the upper jaw by insertion of a set of protrusions on the seat into the pivoting snap locks of the arms of the upper jaw.

3. The tree stand of claim 1, further comprising a spreader bar coupled to the support bar, adjustable along the length of the support bar by engagement with a series of teeth along the support bar, the spreader bar comprising at least one spreader bar oval catch with a major diameter adjacent to an end of the spreader bar.

4. The tree stand of claim 3, in which the platform further comprises a plurality of platform oval catches and the tree stand further comprises a pair of cables, each cable having a first end engaged with said at least one spreader bar oval catch of the spreader bar and a second end engaged with one of the plurality of platform oval catches on the platform.

5. The tree stand of claim 1, in which each of the toothed pawls further comprise a spring biased ratchet safety screw engaged with the pawl and the body of the jaw on which the toothed pawl is mounted, to maintain and secure the pawl in engagement with the toothed ratchet wheel of the strap control axle.

6. The tree stand of claim 1, in which each of the upper jaw and the lower jaw further comprise a strap having a first end received within a slot on the shaft of the strap control axle and a second end which wraps around the tree and is received within the slot on the shaft of the control axle.

7. The tree stand of claim 1, in which each of the pivoting snap locks comprise:
    a) a pair of spaced apart sides with rear apertures,
    b) a top extending between the spaced apart sides to a rear actuation tab,
    c) front lower locking notches defined between the pair of spaced apart sides, and
    d) a spring between the protrusion and the pivoting snap lock to bias the pivoting snap lock to a closed position in which the front lower locking notches cover and block the outward-facing notch of the arm of the jaw.

* * * * *